(12) United States Patent
Tazoe

(10) Patent No.: US 7,510,583 B2
(45) Date of Patent: Mar. 31, 2009

(54) CELL ELECTRODE PLATE AND PROCESS FOR PRODUCING THE SAME

(75) Inventor: Nobuhiro Tazoe, Koto-ku (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 231 days.

(21) Appl. No.: 10/592,675

(22) PCT Filed: Apr. 20, 2005

(86) PCT No.: PCT/JP2005/007499

§ 371 (c)(1),
(2), (4) Date: Sep. 13, 2006

(87) PCT Pub. No.: WO2005/104271

PCT Pub. Date: Nov. 3, 2005

(65) Prior Publication Data

US 2007/0187231 A1    Aug. 16, 2007

(30) Foreign Application Priority Data

Apr. 21, 2004    (JP)    ............... 2004-125523

(51) Int. Cl.
*H01M 4/82* (2006.01)
(52) U.S. Cl. .............. 29/623.2; 29/623.5; 29/623.1; 429/233; 429/232; 429/234; 429/245; 429/209
(58) Field of Classification Search ............. 29/623.2, 29/623.5, 623.1; 429/233, 232, 234, 245, 429/217, 209
See application file for complete search history.

(56) References Cited

U.S. PATENT DOCUMENTS

| | | | |
|---|---|---|---|
| 5,007,467 A | 4/1991 | Nelles | |
| 6,146,694 A | 11/2000 | Reimers et al. | |
| 6,162,264 A * | 12/2000 | Miyazaki et al. | ............ 29/623.5 |
| 2005/0031961 A1* | 2/2005 | Tsunekawa et al. | ......... 429/233 |
| 2005/0058889 A1* | 3/2005 | Goishihara | ................... 429/94 |
| 2007/0187231 A1 | 8/2007 | Tazoe | |

FOREIGN PATENT DOCUMENTS

| | | |
|---|---|---|
| JP | 6-52849 | 2/1994 |
| JP | 09-274909 | 10/1997 |
| JP | 10-228930 | 8/1998 |

(Continued)

OTHER PUBLICATIONS

U.S. Appl. No. 11/813,108, filed Jun. 29, 2007, Tazoe et al.

*Primary Examiner*—Bruce F Bell
(74) *Attorney, Agent, or Firm*—Oblon, Spivak, McClelland, Maier & Neustadt, P.C.

(57) ABSTRACT

A cell electrode plate in which at least one of opposite widthwise ends of longitudinally discontinuous exposed portions with no coatings made of electrode active material on a core member made of metal foil includes pass-by transition portions for press rolls, the transition portions having a thickness substantially the same as that of the coatings. As a result, without complicating a production line, a core member is prevented from being broken and the production line is operated smoothly so as to attain improved productive efficiency and reduced equipment expenses.

15 Claims, 4 Drawing Sheets

FOREIGN PATENT DOCUMENTS

| | | |
|---|---|---|
| JP | 11-003701 | 1/1999 |
| JP | 11-185737 | 7/1999 |
| JP | 2000-133250 | 5/2000 |
| JP | 2000-251942 | 9/2000 |
| JP | 2001-52679 | 2/2001 |
| JP | 2002-343345 | 11/2002 |

\* cited by examiner

CELL ELECTRODE PLATE AND PROCESS FOR PRODUCING THE SAME

TECHNICAL FIELD

The present invention relates to a cell electrode plate and a process for producing the same, said cell electrode plate comprising a band-like core member made of metal foil with a plurality of coatings made of electrode active material applied longitudinally of and discontinuously on at least one of upper and lower surfaces of the core member.

BACKGROUND ART

In production of a cell electrode such as lithium-cell positive pole member, conventionally, electrode mixture or positive pole active material such as $LiCoO_2$ is applied and dried on a core member or collector made of metal foil such as aluminum or copper foil and then is pressed by a roll press machine with press rolls so as to enhance bulk density of the positive pole active material.

The cell electrode plate thus produced by applying and drying the electrode active material such as positive pole active material on the core member is shown in FIGS. 1 and 2 in which reference numeral 1 denotes a band-like core member or collector made of metal foil such as aluminum foil having substantially uniform width; 2, coatings made of electrode active material such as positive pole active material applied and dried as sheets on upper and/or lower surface of the core member 1. The core member 1 and the coatings 2 provide a cell electrode plate 3. The coatings 2 of uniform size are arranged longitudinally of and discontinuously on the core member 1.

Pressing of the cell electrode plate 3 shown in FIGS. 1 and 2 by press rolls of a roll press machine is shown in FIGS. 3 and 4 in which reference numeral 4 denotes a roll press machine with a pair of upper and lower press rolls 5 and 6. The cell electrode plate 3 is pressed while it is passed through the rolls 5 and 6, the coatings 2 made of electrode active material being compressed for improvement of its bulk density.

Prior art about application of electrode active material on a core member made of metal foil is shown, for example, by Reference 1 and prior art about pressing of electrode active material by press rolls of a roll press machine for improvement of bulk density of the electrode active material is shown, for example, by Reference 2.
[Reference 1] JP 9-274909 A
[Reference 2] JP 11-3701 A

SUMMARY OF THE INVENTION

Problems to be Solved by the Invention

However, when the core member 1 made of metal foil and having the coatings 2 made of electrode active material arranged longitudinally of and discontinuously on the core member is pressed by the press rolls 5 and 6 of the roll press machine 4 for improvement of bulk density of the electrode active material as shown in FIGS. 3 and 4 and upon passage, through the press rolls 5 and 6, of discontinuous exposed portions 7 of the core member 1 where no coatings 2 are provided, the press rolls 5 and 6 may fall in the exposed portions 7 to attack the core member 1, disadvantageously resulting in possible breakage of the core member 1 and resultant lowering of productive efficiency due to shutdown of the production line.

In order to prevent the core member 1 from being broken, low tension applicators may be arranged at inlet and outlet sides of the roll press machine 4 so as to apply low tension to the core member 1. However, this is disadvantageous in complicated production line and increased equipment expenses.

In view of the above, the invention was made to provide a cell electrode plate and a process for producing the same which can, without complicating the production line, surely prevent a core member made of metal foil from being broken, smoothen the operation of the production line and improve the production efficiency and reduce the equipment expenses.

Means or Measures for Solving the Problems

The invention is directed to a cell electrode plate comprising a band-like core member made of metal foil with a plurality of coatings made of electrode active material applied longitudinally of and discontinuously on at least one of upper and lower surfaces of the core member, said core member being pressed by press rolls, wherein at least one of opposite widthwise ends of longitudinally discontinuous exposed portions of the core member with no coatings is provided with pass-by transition portions for the press rolls, said transition portions having thickness substantially same as that of the coatings.

In the cell electrode plate, the transition portions are preferably made of electrode active material same as that of which the coatings are made.

In the cell electrode plate, the transition portions may be arranged to bridge the widthwise ends of the adjacent coatings together; alternatively, the transition portions may be arranged to have required spacing from the widthwise ends of the adjacent coatings.

In the cell electrode plate, the transition portions are preferably arranged outwardly of the trimming lines on the opposite widthwise ends of the core member.

The invention is also directed to a process for producing a cell electrode plate, said cell electrode plate comprising a band-like core member made of metal foil with a plurality of coatings made of electrode active material applied longitudinally of and discontinuously on at least one of upper and lower surfaces of the core member, said core member being pressed by press rolls, wherein at least one of opposite widthwise ends of longitudinally discontinuous exposed portions of the core member with no coatings is provided with pass-by transition portions for the press rolls, said transition portions having thickness substantially same as that of the coatings, the core member with the transition portions being pressed by the press rolls to thereby produce a cell electrode plate.

In the process for producing the cell electrode plate, the transition portions are preferably made of electrode active material same as that of which the coatings are made.

In the process for producing the cell electrode plate, the transition portions may be arranged to bridge widthwise ends of the adjacent coatings together; alternatively, the transition portions may be arranged to have required spacing from the widthwise ends of the adjacent coatings.

In the process for producing the cell electrode plate, the transition portions are preferably arranged outwardly of trimming lines on the opposite widthwise ends of the core member.

Effects of the Invention

According to a cell electrode plate and a process for producing the same of the invention, excellent effects can be obtained such that, without complicating the production line, a core member made of metal foil can be certainly prevented from being broken and the production line can be smoothly operated to thereby attain improved productive efficiency and reduced equipment expenses.

Figure 1:
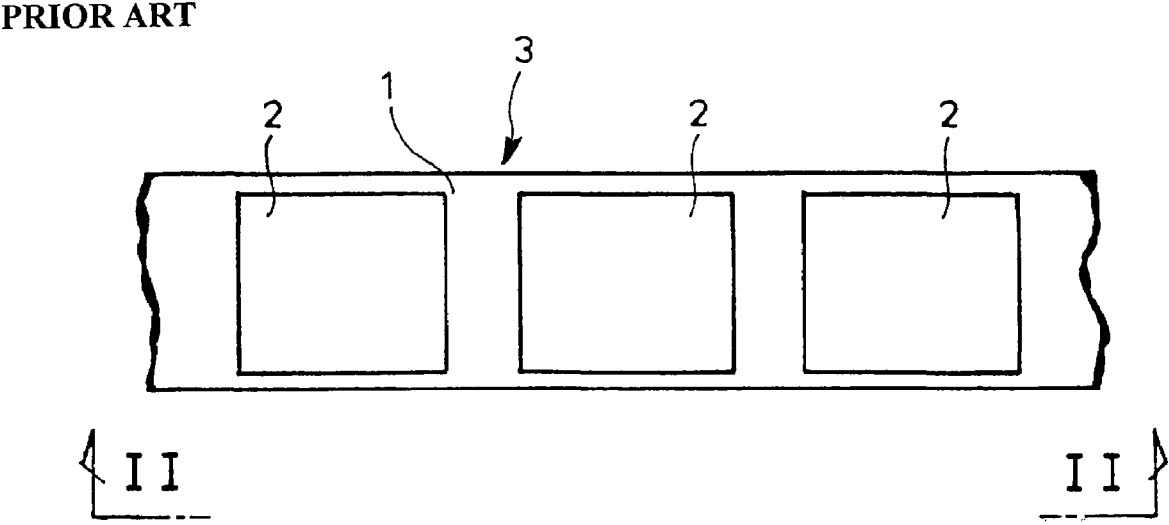
FIG. 1 A plan view showing a conventional cell electrode plate and a conventional process for producing the same.
Figure 2:
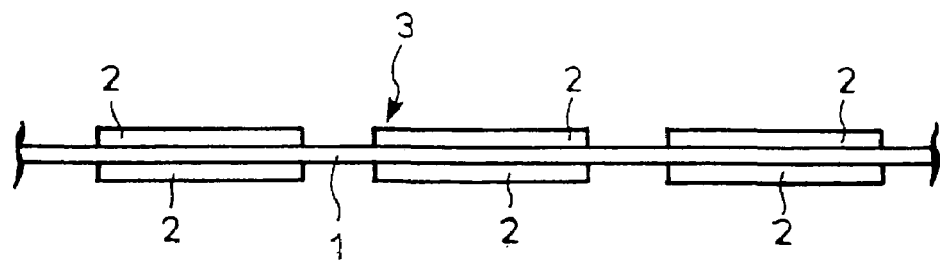
FIG. 2 A view looking in the direction of arrows II in FIG. 1.
Figure 3:
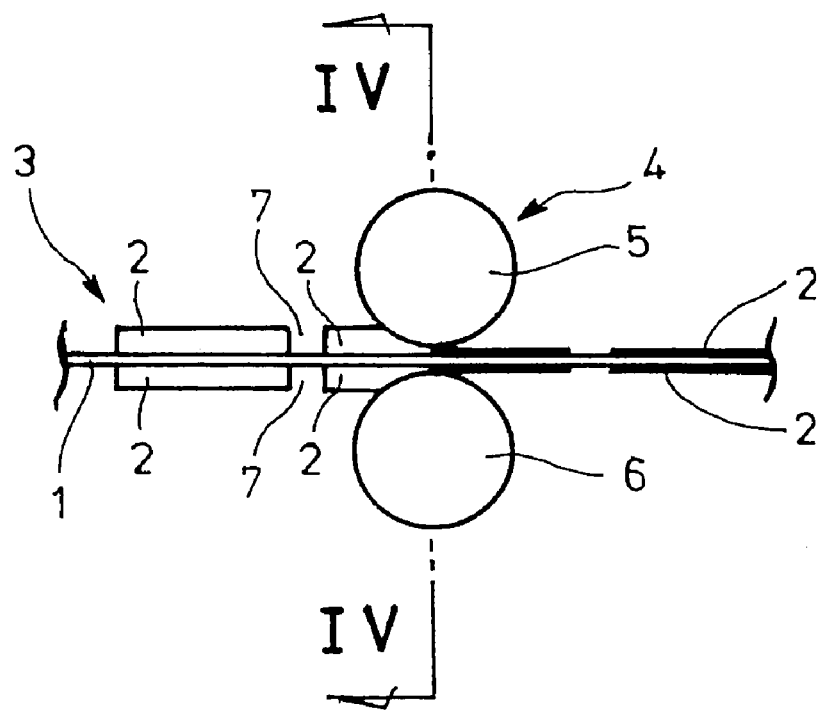
FIG. 3 A side view showing pressing of the cell electrode plate by a roll press machine.
Figure 4:
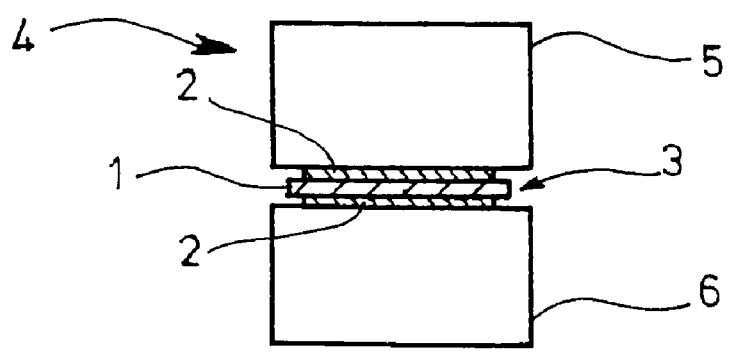
FIG. 4 A view looking in the direction of arrows IV in FIG. 3.

EXPLANATION OF THE REFERENCE NUMERALS 1 core member made of metal foil
2 coatings made of electrode positive material
3 cell electrode plate
4 roll press machine
5 press roll
6 press roll
7 discontinuous exposed portion
8 pass-by transition portion for press roll
L trimming line

BEST MODE FOR CARRYING OUT THE INVENTION

Embodiments of the invention will be disclosed in conjunction with attached drawings.

Embodiment 1

Figure 5:
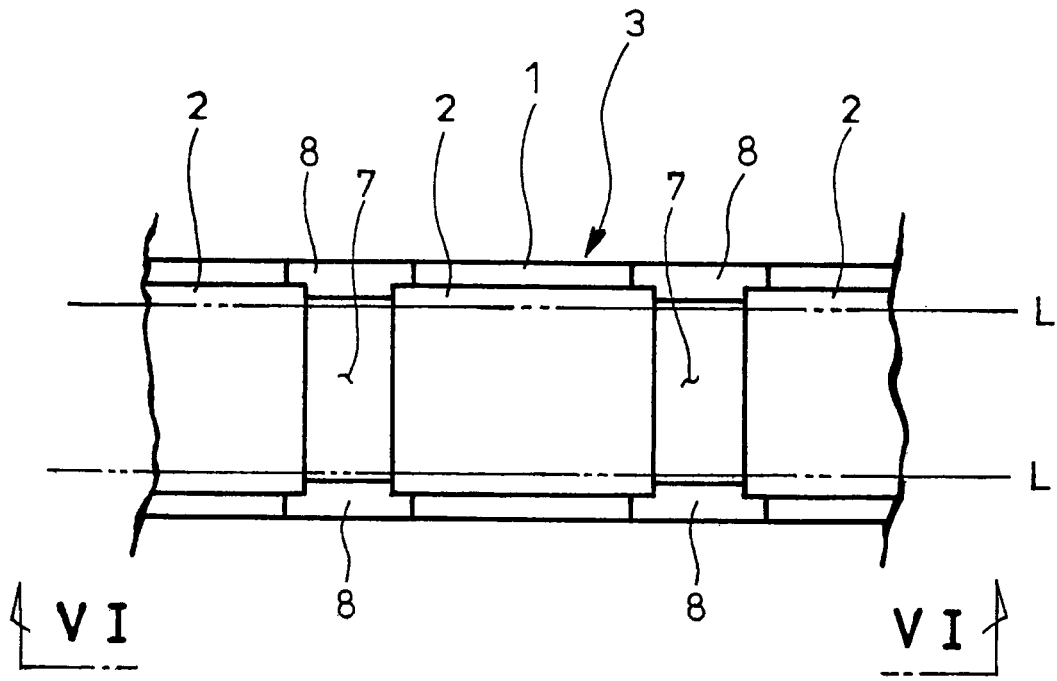
FIG. 5 A plan view showing an embodiment of the invention.
Figure 6:
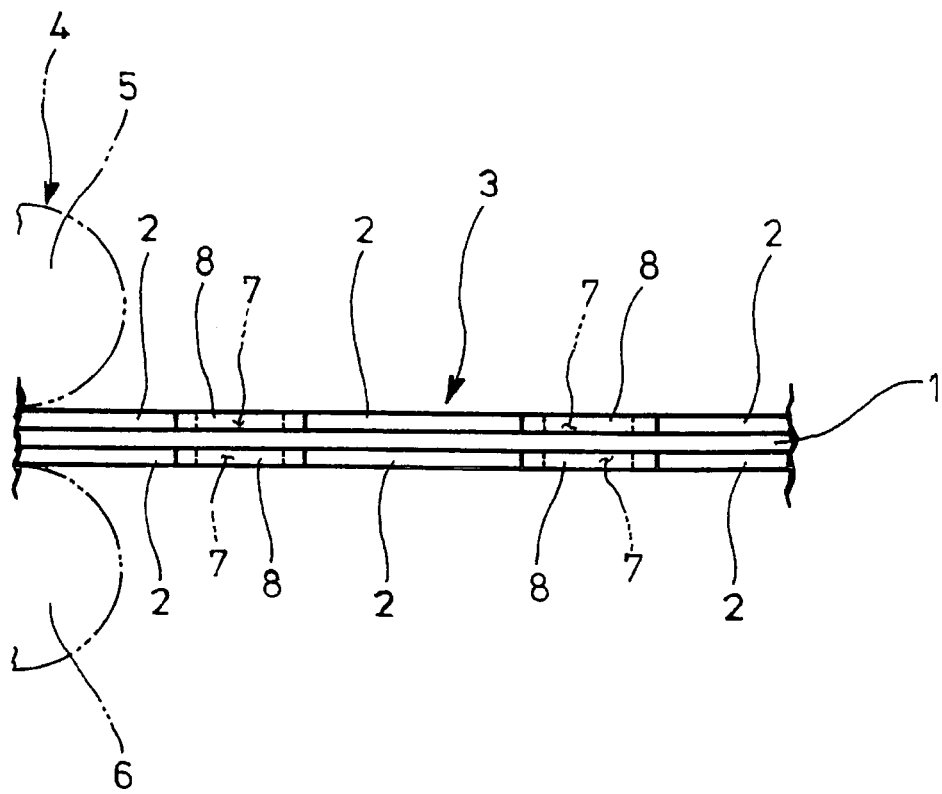
FIG. 6 A view looking in the direction of arrows VI in FIG. 5.

FIGS. 5 and 6 show an embodiment of the invention in which parts similar to those shown in FIGS. 1-4 are represented by the same reference numerals. The embodiment is fundamentally similar in structure to the prior art shown in FIGS. 1-4 and resides in that, as shown in FIGS. 5 and 6, opposite widthwise ends of longitudinally discontinuous exposed portions 7 on a core member 1 made of metal foil, which has no coatings 2 made of electrode active material, are provided with pass-by transition portions 8 for the press rolls, said transition portions 8 having thickness substantially same as that of the coating 2.

In the embodiment, the transition portions 8 are made of electrode active material same as that of which the coatings 2 are made and arranged to bridge the widthwise ends of the adjacent coatings 2 together. For trimming which is conducted after pressing of the cell electrode plate 3 in such a manner that the opposite widthwise ends of the core member 1 are cut by predetermined size, the transition portions 8 are arranged outwardly of trimming lines on the core member 1.

Next, mode of operation of the above embodiment will be described.

Where the core member 1 with the coatings 2 made of electrode active material and arranged longitudinally of and discontinuously on the core member is pressed by the press rolls 5 and 6 of the roll press machine 4 so as to enhance the bulk density of the electrode active material and when the discontinuous exposed portions 7 longitudinally on the core member 1 with no coatings 2 are passed through the press rolls 5 and 6, the press rolls 5 and 6 crush up and run upon the transition portions 8 so that, unlike the prior art, the press rolls 5 and 6 are prevented from falling in the discontinuous exposed portions 7 on the core member 1 and attacking the core member 1 into possible breakage of the core member 1. As a result, averted are shutdown of the production line and lowering of the productive efficiency.

Moreover, unlike the prior art, the core member 1 can be prevented from being broken without providing lower tension applicators at inlet and outlet sides of the roll press machine 4 for application of lower tension on the core member 1, so that averted are complicated production line and increased equipment expenses.

In the present embodiment, the transition portions 8 are arranged at opposite widthwise ends of the discontinuous exposed portions 7; however, they may be provided at only one of the widthwise ends of the discontinuous exposed portions 7, which is also effective for prevention of the press rolls 5 and 6 from attacking the core member 1.

The transition portions 8 may be made of material different from the material of which the coatings 2 are made. However, if as in the present embodiment they are made of electrode active material same as that of which the coatings 2 are made, then the transition portions 8 may be provided concurrently upon arrangement of the coatings 2 in the form of application of the electrode active material on the core member 1, which eliminates the necessity of providing the transition portions 8 in a separate step.

After the cell electrode plate 3 is pressed, trimming is conducted through cutting the opposite widthwise ends of the core member 1 by predetermined size; on the other hand, the discontinuous exposed portions 7 are required to be exposed for, for example, connection of electrode wires. In the embodiment, the transition portions 8 are arranged outwardly of trimming lines L on the opposite widthwise ends of the core member 1 and therefore are cut out by the trimming, so that there is no fear of connection of for example electrode wires to the discontinuous exposed portions 7 being inhibited.

Thus, the core member 1 can be certainly prevented from being broken and the production line can be smoothly operated to attain improved productive efficiency and reduced equipment expenses.

Embodiment 2

Figure 7:
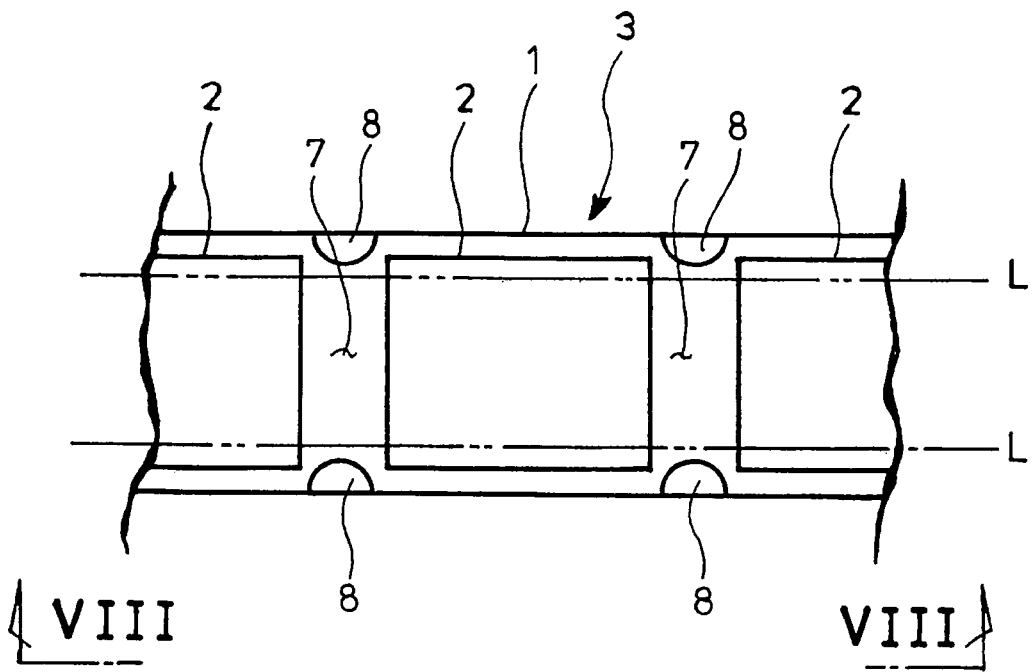
FIG. 7 A plan view showing a further embodiment of the invention.
Figure 8:
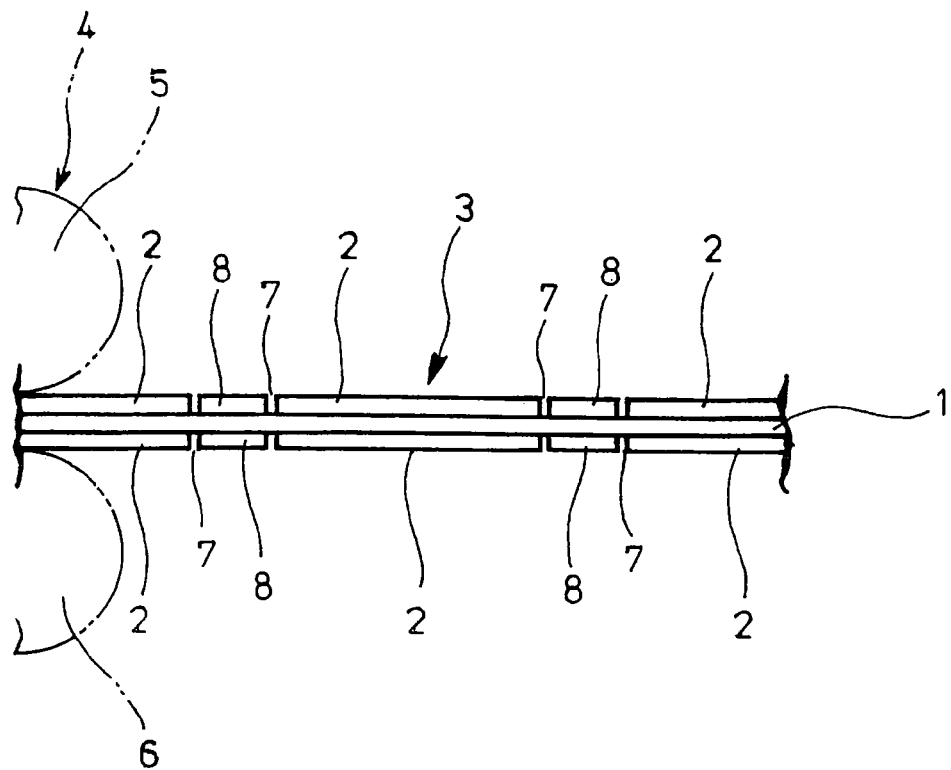
FIG. 8 A view looking in the direction of arrows VIII in FIG. 7.

FIGS. 7 and 8 show a further embodiment of the invention in which parts similar to those shown in FIGS. 5 and 6 are represented by the same reference numerals and in which pass-by transition portions 8 for press rolls are arranged to have required spacing from the widthwise ends of the adjacent coatings 2.

In the embodiment, as in the embodiment shown in FIGS. 5 and 6, the transition portions 8 are made of electrode active material same as that of which the coatings 2 are made, and are arranged outwardly of the trimming lines L on the opposite widthwise ends of the core member 1. Their planar shape is semicircular; however, of course, it may be of rectangle or other polygon.

Arrangement of the transition portions 8 to have required spacing from the widthwise ends of the adjacent coatings 2 as shown in FIGS. 7 and 8 may attain effects and advantages same as those in the embodiment shown in FIGS. 5 and 6. This is also advantageous in that the electrode active material required for the transition portions 8 is minimized.

It is to be understood that a cell electrode plate and a process for producing the same according to the invention are not limited to the above-mentioned embodiments and that various changes and modifications may be applied without departing from the spirit of the invention. For example, the invention may be applicable for both of cell positive- and negative-pole.

INDUSTRIAL APPLICABILITY

A cell electrode plate and a process for producing the same according to the invention may be properly applicable to for example a lithium-cell positive pole member in which electrode mixture or positive pole active material such as $LiCoO_2$ is applied and dried on a core member or collector made of metal foil such as aluminum or copper foil and then is pressed by a roll press machine with press rolls so at to enhance bulk density of the positive pole active material.

The invention claimed is:

1. A process for producing a cell electrode plate comprising:
    providing a band-like core member made of metal foil with a plurality of coatings made of electrode active material and applied longitudinally of and discontinuously on at least one of upper and lower surfaces of the core member;
    providing pass-by transition portions at at least one of opposite widthwise ends of longitudinally discontinuous exposed portions with no coatings on the core member, said pass-by transition portions having a thickness substantially same as that of the coatings; and
    pressing the band-like core member with the pass-by transition portions by press rolls.

2. A process for producing a cell electrode plate as claimed in claim 1, wherein the pass-by transition portions are made of electrode active material same as that of which the coatings are made.

3. A process for producing a cell electrode plate as claimed in claim 2, wherein the pass-by transition portions are arranged to bridge widthwise ends of adjacent coatings together.

4. A process for producing a cell electrode plate as claimed in claim 3, wherein the pass-by transition portions are arranged outwardly of trimming lines on the opposite widthwise ends of the core member.

5. A process for producing a cell electrode plate as claimed in claim 2, wherein the pass-by transition portions are arranged to have a required spacing from widthwise ends of adjacent coatings.

6. A process for producing a cell electrode plate as claimed in claim 5, wherein the pass-by transition portions are arranged outwardly of trimming lines on the opposite widthwise ends of the core member.

7. A process for producing a cell electrode plate as claimed in claim 2, wherein the pass-by transition portions are arranged outwardly of trimming lines on opposite widthwise ends of the core member.

8. A process for producing a cell electrode plate as claimed in claim 1, wherein the pass-by transition portions are arranged to bridge widthwise ends of adjacent coatings together.

9. A process for producing a cell electrode plate as claimed in claim 8, wherein the pass-by transition portions are arranged outwardly of trimming lines on the opposite widthwise ends of the core member.

10. A process for producing a cell electrode plate as claimed in claim 1, wherein the pass-by transition portions are arranged to have a required spacing from widthwise ends of adjacent coatings.

11. A process for producing a cell electrode plate as claimed in claim 10, wherein the pass-by transition portions are arranged outwardly of trimming lines on the opposite widthwise ends of the core member.

12. A process for producing a cell electrode plate as claimed in claim 1, wherein the pass-by transition portions are arranged outwardly of trimming lines on opposite widthwise ends of the core member.

13. A process for producing a cell electrode plate, comprising:
    providing a cell electrode plate including a band-like core member made of metal foil with a plurality of coatings made of electrode active material and applied longitudinally of and discontinuously on at least one of upper and lower surfaces of the core member;
    providing pass-by transition portions at at least one of opposite widthwise ends of longitudinally discontinuous exposed portions of the core member with no coatings, said pass-by transition portions having a thickness substantially same as that of the coatings;
    pressing the band-like core member with the pass-by transition portions by the press rolls to thereby produce a cell electrode plate,
    wherein the transition portions are arranged to have a required spacing from the widthwise ends of adjacent coatings.

14. A process for producing a cell electrode plate as claimed in claim 13, wherein the pass-by transition portions are made of electrode active material same as that of which the coatings are made.

15. A process for producing a cell electrode plate as claimed in claim 13, wherein the pass-by transition portions are arranged outwardly of trimming lines on the opposite widthwise ends of the core member.

* * * * *